(12) United States Patent
Takahashi et al.

(10) Patent No.: US 8,058,974 B2
(45) Date of Patent: Nov. 15, 2011

(54) INTEGRATED CIRCUIT PROCESSING DEVICE AND INTEGRATED CIRCUIT PROCESSING METHOD

(75) Inventors: Yuji Takahashi, Kawasaki (JP); Toru Ozaki, Kawasaki (JP); Masanobu Hatanaka, Kawasaki (JP); Hirohisa Naito, Kawasaki (JP); Takahiro Kii, Kawasaki (JP); Kazumi Kubota, Kawasaki (JP); Akira Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 459 days.

(21) Appl. No.: 12/414,665

(22) Filed: Mar. 31, 2009

(65) Prior Publication Data

US 2009/0243806 A1    Oct. 1, 2009

(30) Foreign Application Priority Data

Mar. 31, 2008   (JP) .................................. 2008-092970

(51) Int. Cl.
*H04Q 5/22* (2006.01)

(52) U.S. Cl. .................................... 340/10.1; 340/572.1
(58) Field of Classification Search .............. 340/572.7, 340/10.1, 572.1
See application file for complete search history.

(56) References Cited

U.S. PATENT DOCUMENTS

2008/0287160 A1*   11/2008   Sasai et al. ................. 455/556.2

FOREIGN PATENT DOCUMENTS

JP              2003-346094           12/2003

* cited by examiner

*Primary Examiner* — Shirley Lu
(74) *Attorney, Agent, or Firm* — Fujitsu Patent Center

(57) ABSTRACT

An electric signal is allowed to reach loop antennas disposed adjacently to one another from an RFID antenna as a starting point by electromagnetic induction, which permits one IC chip processing device to exert a function equivalent to that exerted by a plurality of IC chip processing devices. Further, the loop antennas are superimposed on a display screen of a display system of an information providing apparatus, and the display screen is transparently visible, and therefore it makes possible to utilize a display surface of display contents on the display screen as an IC chip reading surface and dispose a plurality of reading surfaces showing different services provided.

6 Claims, 6 Drawing Sheets

INTEGRATED CIRCUIT PROCESSING DEVICE AND INTEGRATED CIRCUIT PROCESSING METHOD

CROSS-REFERENCE TO RELATED APPLICATION(S)

This application is based upon and claims the benefit of priority of the prior Japanese Patent Application No. 2008-092970, filed on Mar. 31, 2008, the entire contents of which are incorporated herein by reference.

FIELD

The present invention relates to an integrated circuit processing device that is configured with at least one loop antenna and a control circuit and provides services to a user by transmitting information to integrated circuits mounted in an integrated circuit mounting medium through near field radio communication via the loop antenna, and an integrated circuit processing method that is performed by the integrated circuit processing device.

BACKGROUND

In recent years, remarkably widely used are cards and cell phones (osaifu keitai (trademark) (wallet phone)) that have a passive type communication function via an antenna and are mounted with contactless type integrated circuits capable of storing information (for example, FeliCa (trademark)), and various services that utilize contactless type integrated circuits have appeared. As the services provided with the use of contactless type integrated circuits, main services are a payment and clearing service and the like, and lately, services that provide information via contactless type integrated circuits have also been provided. For example, information providing apparatuses such as kiosk terminals and electronic posters that have a display screen and provide information via contactless type integrated circuits have appeared.

Here, to utilize the services that use contactless type integrated circuits, it is necessary for a contactless type integrated circuit to be held over a dedicated reader/writer device. The reader/writer device is a device for exchanging information through communication with the contactless type integrated circuit. The reader/writer device has an antenna to carry out communication with the contactless type integrated circuit.

To effectively mount the reader/writer device in an information providing apparatus, for example, as disclosed in Japanese Laid-open Patent Publication No. 2003-346094, proposed is an information processing system that has a reader/writer device in its housing and is disposed with an antenna of the reader/writer device in a fixed portion of the surface or the back surface of the display screen of the system. When services that utilize a contactless type integrated circuit are provided, this information providing apparatus can facilitate the utilization of the services that use the contactless type integrated circuit by clearly specifying a disposing position of the antenna to a user.

However, in a conventional technology represented by the technology disclosed in Japanese Laid-open Patent Publication No. 2003-346094, in order to absorb differences in each implementation specification of a contactless type integrated circuit by an information providing apparatus, or in order to shorten the processing time consumed in providing services when a plurality of the services utilizing a contactless type integrated circuit are provided, a plurality of reader/writer devices are necessary to be mounted in the information providing apparatus, and at this time, the following problem arises.

In other words, the manufacturing cost of the information providing apparatus is increased because a plurality of reader/writer devices are mounted therein. Further, since a plurality of reader/writer devices are mounted in the housing of the information providing apparatus, it is necessary to ensure a space for the mounting, giving rise to a difficulty in making the housing more compact. Furthermore, the information providing apparatus needs processing time to make arrangements (polling processing) of a plurality of the reader/writer devices.

Still further, antennas of a plurality of the reader/writer devices interfere with one another, and this leads to a fear that the interference causes a trouble in communication with the contactless type integrated circuit. In addition, it sometimes occurs that a menu display for guiding presentation of services on the display screen of the information providing apparatus and the antennas of the reader/writer devices are apart from each other, and therefore conveying a precise position over which the contactless type integrated circuit is held to receive a desired service is difficult.

SUMMARY

According to an aspect of an embodiment, an integrated circuit processing device includes a first loop antenna; a control circuit for providing a service to a user by transmitting information to an integrated circuit mounted in an integrated circuit mounting medium through near field radio communication via the first loop antenna; and a position detecting panel that detects a position where the integrated circuit mounting medium contacts or is held over, the position detecting panel being disposed so as to cover the first loop antenna.

According to an aspect of an embodiment, an integrated circuit processing method is for an integrated circuit processing device that includes a first loop antenna, and a control circuit for providing a service to a user. The integrated circuit processing method includes detecting a position where the integrated circuit mounting medium contacts or is held over by a position detecting panel, the position detecting panel being disposed so as to cover the first loop antenna; and providing a service to a user by transmitting information to an integrated circuit mounted in an integrated circuit mounting medium through near field radio communication via the first loop antenna.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Hereinafter, embodiments according to an integrated circuit processing device and an integrated circuit processing method of the present invention will be explained in details with reference to the accompanying drawings. Note that in the following embodiments, the integrated circuit processing device is a reading/writing (reading and writing) device (hereinafter, referred to as IC chip processing device) that provides services by reading and writing information between integrated circuits and the integrated circuit processing device through information communications with the integrated circuits capable of storing information. However, the integrated circuit processing device is not limited to the above and may be a reader that only reads out information from the integrated circuits.

Further, in the following embodiments, the integrated circuit is a contactless type integrated circuit chip (IC, in the following embodiments, referred to as IC chip). Furthermore, of contactless type IC chips, the IC chip is a proximity type IC chip capable of communication within a distance of up to ten centimeters. However, the IC chip is not limited to a proximity type IC chip and may be a close type IC chip capable of communication within a distance of up to two millimeters, a vicinity type IC chip capable of communication within a distance of up to seventy centimeters, or a remote type IC chip capable of communication within a distance exceeding seventy centimeters. Moreover, the integrated circuit may be a contact type IC chip.

An integrated circuit mounting medium (in the following embodiments, referred to as IC chip mounting medium) is a plastic card with the size of a cash card, a mobile phone, or the like; however, any medium suitable for being mounted with the integrated circuit may be acceptable. The integrated circuit is connected to a loop antenna inside the integrated circuit mounting medium. The loop antenna inside the integrated circuit mounting medium is affected by electromagnetic induction generated by an antenna of the integrated circuit processing device, whereby the integrated circuit communicates with the integrated circuit processing device with the use of a radio wave or a change in the electric field as a carrier wave.

Figure 1A:
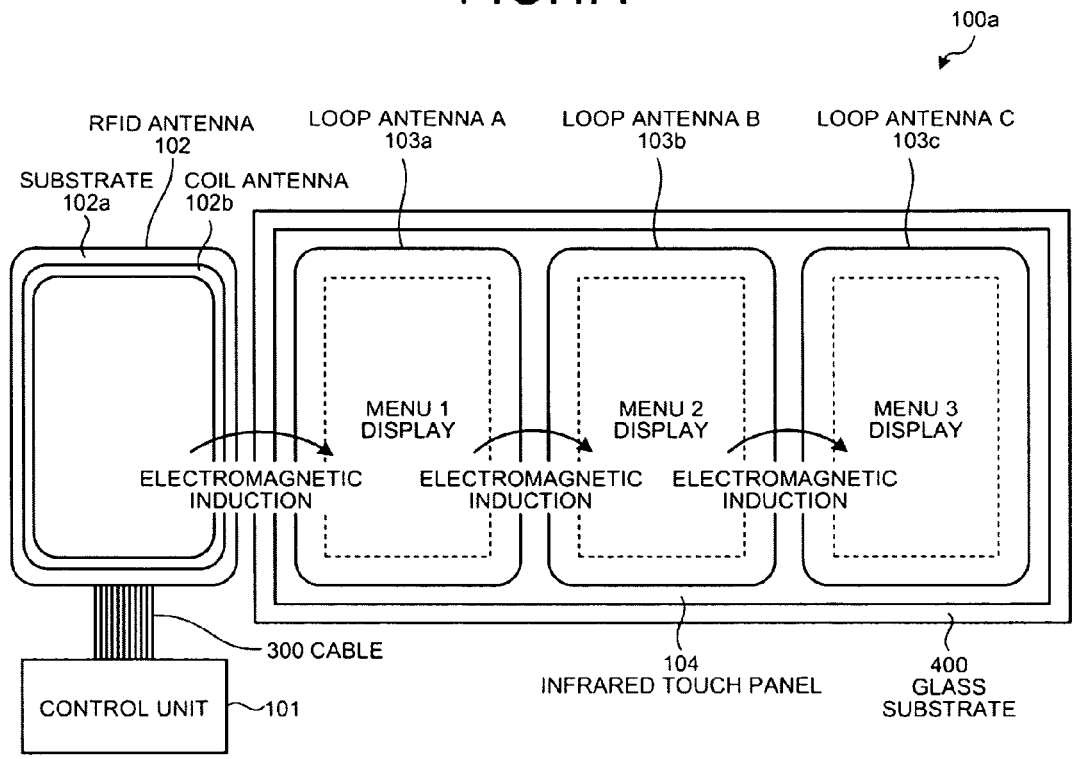
FIG. 1A is a diagram representing general outlines of an IC chip processing device according to a first embodiment.
Figure 1B:
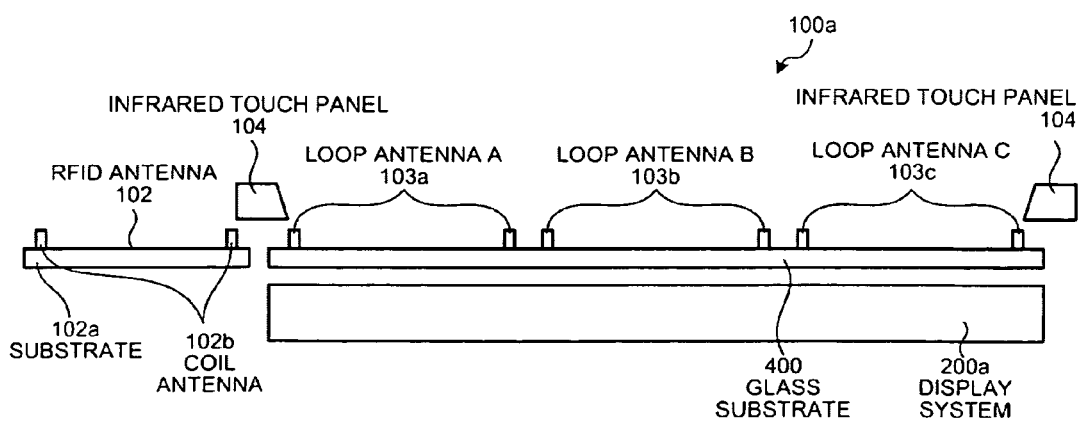
FIG. 1B is a cross sectional view representing an antenna unit of the IC chip processing device according to the first embodiment.

Hereinafter, a first embodiment will be explained with reference to FIGS. 1A to 3. FIG. 1A is a diagram representing general outlines of an IC chip processing device according to the first embodiment. FIG. 1B is a diagram representing a transverse cross section of an antenna unit of the IC chip processing device according to the first embodiment.

As depicted in FIG. 1A, in an IC chip processing device 100a according to the first embodiment, a control unit 101 that performs control processing of the IC chip processing device 100a and a radio frequency identification (RFID) antenna 102 are electrically connected to each other via a cable 300. In other words, the RFID antenna 102 is configured by being disposed with a coil antenna 102b on a substrate 102a and is operated by being supplied with electric signals from the control unit 101.

On a glass substrate 400 that is superimposed on a display screen of a display system not shown, a loop antenna A 103a, a loop antenna B 103b, and a loop antenna C 103c are disposed adjacently to the RFID antenna 102 and parallel to one another. None of the loop antenna A 103a, the loop antenna B 103b, and the loop antenna C 103c is connected to any control device that provides electric signals.

When an electric signal flows through the RFID antenna 102, a radio wave transmitting the electric signal reaches the loop antenna A 103a by electromagnetic induction according to the Fleming's right-hand rule, and the electric signal flows through the loop antenna A 103a by the radio wave reached.

When the electric signal flows through the loop antenna A 103a, the radio wave transmitting the electric signal further reaches the loop antenna B 103b by electromagnetic induction, and the electric signal flows through the loop antenna B 103b by the radio wave reached. In addition, when the electric signal flows through the loop antenna B 103b, the radio wave transmitting the electric signal further reaches the loop antenna C 103c by electromagnetic induction, and the electric signal flows through the loop antenna C 103c by the radio wave reached.

In this way, the electric signal reaches the loop antenna A 103a, the loop antenna B 103b, and the loop antenna C 103c disposed adjacently to one another by electromagnetic induction from the RFID antenna 102 as a starting point, whereby each loop antenna is operated. That is, the RFID antenna 102, the loop antenna A 103a, the loop antenna B 103b, and the loop antenna C 103c serve as an integrated antenna.

All of the loop antenna A 103a, the loop antenna B 103b, and the loop antenna C 103c are covered with a single piece of an infrared touch panel 104. The infrared touch panel 104 has a contact detection surface on the lower-most layer on the panel. Therefore, the infrared touch panel 104 is capable of detecting and obtaining a position (hereinafter, referred to as IC chip mounting medium detection position. An IC chip mounting medium detection position is represented by a coordinate or the like.) on a top surface of the panel that is contacted or held over by an IC chip mounting medium. The infrared touch panel 104 has transparency. Note that a surface that is contacted or held over by the IC chip mounting medium for communication with the IC chip processing device 100a is called "reading surface".

A menu 1 display on a display screen of the display system is superimposed on the loop antenna A 103a to be displayed, a menu 2 display is superimposed on the loop antenna B 103b to be displayed, and a menu 3 display is superimposed on the loop antenna C 103c to be displayed. Since the glass substrate 400 and the infrared touch panel 104 on which the loop antenna A 103a, the loop antenna B 103b, and the loop antenna C 103c are disposed have transparency, the menu 1 display, the menu 2 display, and the menu 3 display are visible through the glass substrate 400 and the infrared touch panel 104 regardless of the disposition of the loop antenna A 103a, the loop antenna B 103b, and the loop antenna C 103c.

Since an IC chip mounting medium detection position is obtained by the infrared touch panel 104, it is possible to know which position of the menu 1 display, the menu 2 display, and the menu 3 display the position is applicable to. Accordingly, control becomes possible such that the service be provided is determined from services on the menu 1 display, the menu 2 display, and the menu 3 display (for example, different kinds of coupon information are provided and so forth).

In this manner, by combining one control unit 101, one RFID antenna 102 and a plurality of loop antennas, a function equivalent to those of a plurality of IC chip processing devices is exerted. It is possible to superimpose and dispose a plurality of reading surfaces for IC chip on the display screen of the display system.

In other words, a single IC chip processing device is allowed to exert a function equivalent to those of a plurality of IC chip processing devices by permitting an electric signal to reach the loop antenna A 103a, the loop antenna B 103b, and the loop antenna C 103c disposed adjacently to one another from the RFID antenna 102 as a starting point by electromagnetic induction. Further, the loop antenna A 103a, the loop antenna B 103b, and the loop antenna C 103 are superimposed on the display screen of the display system of the information providing apparatus, and the display screen is transparently visible, and therefore a display surface of display contents on the display screen can be utilized as a reading surface of the IC chip, and further a plurality of reading surfaces showing different services provided can be disposed.

FIG. 1B is a transverse cross section of the antenna unit of the IC chip processing device according to the first embodiment. Here, the antenna unit is a generic name of the RFID antenna 102, the loop antenna A 103a, the loop antenna B 103b, and the loop antenna C 103c.

As depicted in FIG. 1B, the coil antenna 102b is disposed on a top surface of the substrate 102a of the RFID antenna 102. Adjacently to the substrate 102a, the glass substrate 400 is disposed such that the top surfaces of the substrate 102a and the glass substrate 400 are aligned. On the glass substrate 400, the loop antenna A 103a, the loop antenna B 103b, and the loop antenna C 103c are disposed. The infrared touch panel is disposed so as to cover all of the loop antennas A 103a, the loop antenna B 103b, and the loop antenna C 103c. Note that the display system is disposed below the glass substrate 400.

Figure 2:
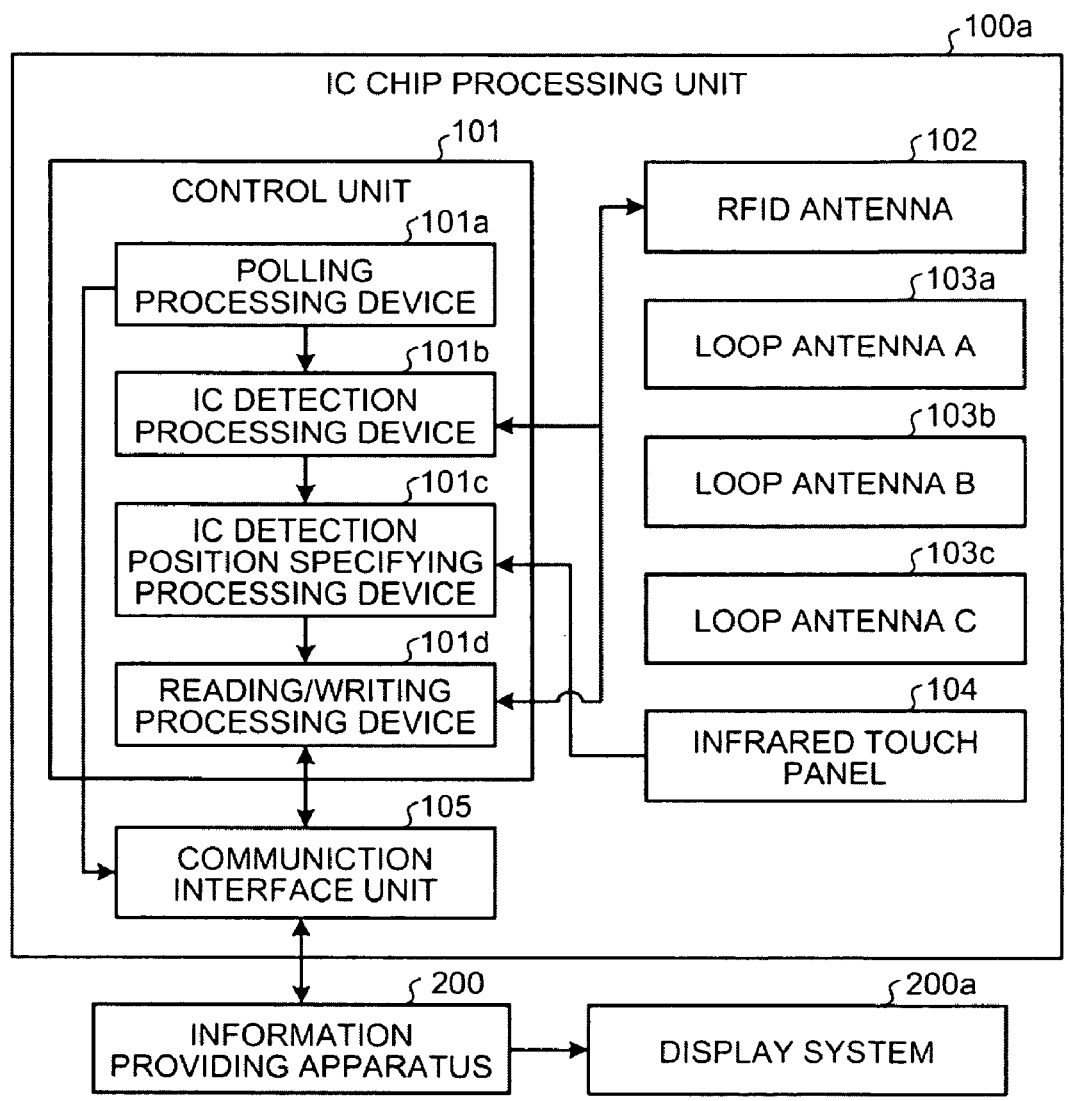
FIG. 2 is a functional block diagram representing a configuration of the IC chip processing device according to the first embodiment.

Next, a configuration of the IC chip processing device according to the first embodiment will be explained. FIG. 2 is a functional block diagram representing the configuration of the IC chip processing device according to the first embodiment. As depicted in FIG. 2, the IC chip processing device 100a according to the first embodiment has the control unit 101, the RFID antenna 102, the loop antenna A 103a, the loop antenna B 103b, the loop antenna C 103c, the infrared touch panel 104, and a communication interface unit 105.

Note that the IC chip processing device 100a is connected to an information providing apparatus 200 having a display system 200a. Further, the IC chip processing device 100a is built in the information providing apparatus 200. The display system 200a uses a liquid crystal display (LCD), a plasma display panel (PDP), a cathode ray tube (CRT), an organic electro-luminescence (EL), or the like for its display screen.

The control unit 101 is a control device to control the entire IC chip processing device 100a and has a polling processing device 101a, an IC detection processing device 101b, an IC detection position specifying processing device 101c, and a reading/writing processing device 101d in the configuration related to the first embodiment.

The polling processing device 101a is a processing device that repeats opening and closing of a communication port of the communication interface unit 105 with a constant period. The IC detection processing device 101b is a processing device that detects an IC chip mounted in the IC chip mounting medium via any of the RFID antenna 102, the loop antenna A 103a, the loop antenna B 103b, and the loop antenna C 103c.

The IC detection position specifying processing device 101c is a processing device that specifies an IC chip mounting medium detection position obtained by the infrared touch panel 104. The reading/writing processing device 101d reads out IC chip information from IC chips mounted in the IC chip mounting medium via any of the RFID antenna 102, the loop antenna A 103a, the loop antenna B 103b, and the loop antenna C 103c. Then, the reading/writing processing device 101d performs processing for providing to a user a service corresponding to the information and an IC chip mounting medium detection position specified by the IC detection position specifying processing device 101c.

Specifically, the reading/writing processing device 101d transmits IC chip information and a demand for providing a service corresponding to an IC chip mounting medium detection position to the information providing apparatus 200 via the communication interface unit 105. The information providing apparatus 200 transmits service information for providing the demanded service to the reading/writing processing device 101d via the communication interface unit 105.

Note that on the display screen of the display system 200a, three menu displays of services provided are displayed (the above-described menu 1 display, menu 2 display, and menu 3 display). The loop antenna A 103a, the loop antenna B 103b, and the loop antenna C 103c are superimposed and disposed on the respective menu displays so as to correspond to the respective menu displays.

Figure 3:
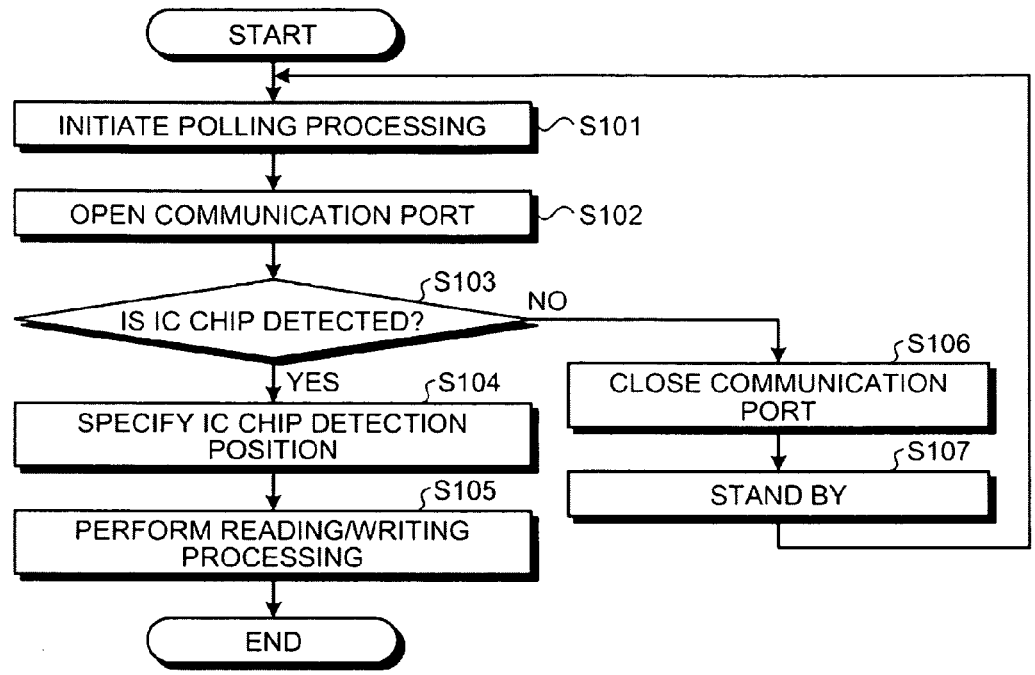
FIG. 3 is a flow chart representing IC chip processing procedures of the first embodiment.

Next, IC processing in the first embodiment will be explained. FIG. 3 is a flow chart representing IC chip processing procedures in the first embodiment. As depicted in FIG. 3, first, the polling processing device 101a initiates polling processing with a constant period (Step S101). Sequentially, the polling processing device 101a opens the communication port of the communication interface unit 105 (Step S102).

Sequentially, the IC detection processing device 101b judges whether an IC chip is detected (Step S103). When the IC detection processing device 101b judges an IC chip is detected (Yes at Step S103), the procedure moves to Step S104. When the IC detection processing device 101b does not judge that an IC chip is detected (No at Step S103), the procedure moves to Step S106.

At Step S104, based on an IC chip mounting medium detection position obtained by the infrared touch panel 104, the IC detection position specifying processing device 101c specifies which display position of the menu displays on the display screen of the display system 200a the IC chip detection position is applicable to.

Sequentially, the reading/writing processing device 101d transmits the IC chip information from the IC chip and the demand for providing the service corresponding to the IC chip mounting medium detection position to the information providing apparatus 200 via the opened communication port of the communication interface unit 105. Then, the reading/writing processing device 101d allows the IC chip that has transmitted the IC chip information and the demand for providing the service corresponding to the IC chip mounting medium detection position to store the service information received from the information providing apparatus 200 via the communication interface unit 105 (the procedures above are at Step S105). When this processing ends, the IC processing ends.

On the other hand, at Step S106, the polling processing device 101a closes the communication port of the communication interface unit 105. Sequentially, the polling processing device 101*a* stands by for processing over a predetermined time (Step S107). When this processing ends, the procedure moves to Step S101.

Figure 4:
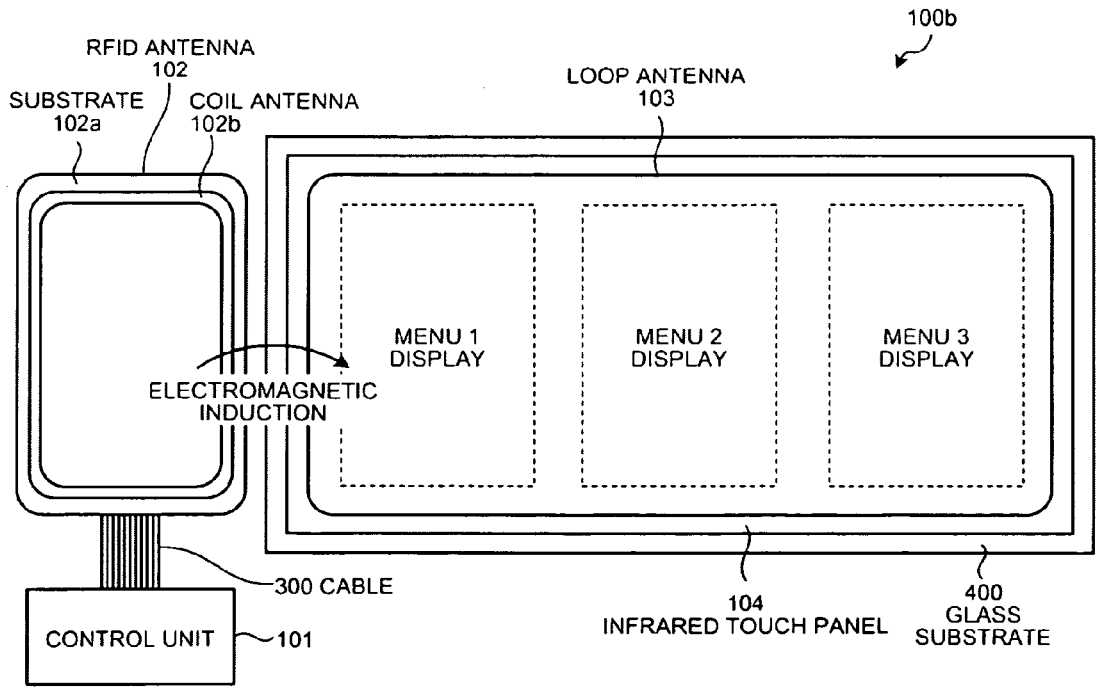
FIG. 4 is a diagram representing general outlines of an IC chip processing device according to a second embodiment.
Figure 5:
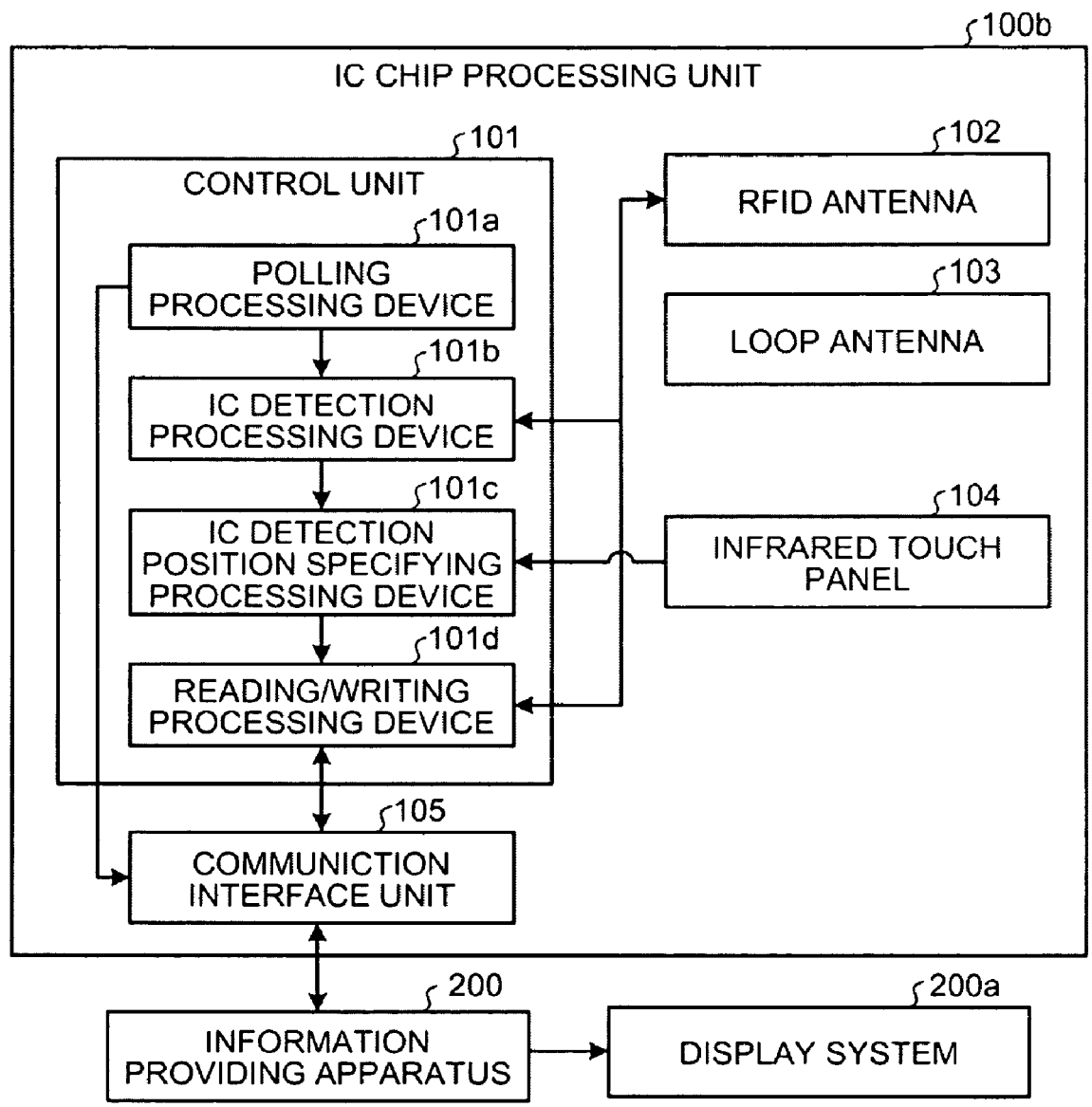
FIG. 5 is a functional block diagram representing a configuration of the IC chip processing device according to the second embodiment.

Hereinafter, a second embodiment will be explained with reference to FIGS. 4 and 5. In the second embodiment, only aspects different from the first embodiment will be explained. FIG. 4 is a diagram representing general outlines of an IC chip processing device according to the second embodiment.

As depicted in FIG. 4, in an IC chip processing device 100*b* according to the second embodiment, the control unit 101 that performs control processing of the IC chip processing device 100*b* and the RFID antenna 102 are electrically connected to each other via the cable 300.

A loop antenna 103 adjacent to the RFID antenna 102 is disposed on the glass substrate 400 that is superimposed on a display screen of a display system not shown. The loop antenna 103 is not connected to any control device that provides electric signals.

When an electric signal flows through the RFID antenna 102, a radio wave transmitting the electric signal reaches the loop antenna 103 by electromagnetic induction according to the Fleming's right-hand rule, and the electric signal flows through the loop antenna 103 by the radio wave reached.

In this manner, the electric signal flows from the RFID antenna 102 as a starting point and reaches the loop antenna 103 disposed adjacently to the RFID antenna 102, and the loop antenna is operated. That is, the RFID antenna 102 and the loop antenna 103 serve as an integrated antenna.

The whole loop antenna 103 is covered with a single piece of the infrared touch panel 104. The infrared touch panel 104 has a contact detection surface on the lower-most layer on the panel, and therefore it is capable of detecting and obtaining an IC chip mounting medium detection position. Moreover, the infrared touch panel 104 has transparency.

All the menu 1 display, the menu 2 display, and the menu 3 display on the display screen of the display system are superimposed on the loop antenna 103 and displayed in parallel. Since the glass substrate 400 and the infrared touch panel 104 on which the loop antenna 103 is disposed have transparency, the menu 1 display, the menu 2 display, and the menu 3 display are visible through the glass substrate 400 and the infrared touch panel 104 regardless of the disposition of the loop antenna 103.

Since an IC chip mounting medium detection position is obtained by the infrared touch panel 104, it is possible to know which position of the menu 1 display, the menu 2 display, and the menu 3 display the position is applicable to. Accordingly, control becomes possible such that a different service depending on services on the menu 1 display, the menu 2 display, and the menu 3 display is provided.

In this manner, by combining the control unit 101, the RFID antenna 102 and a loop antenna, a function equivalent to those of a plurality of IC chip processing devices is exerted. It is possible to superimpose and dispose a plurality of reading surfaces for IC chip on the display screen of the display system.

Next, a configuration of the IC chip processing device according to the second embodiment will be explained. FIG. 5 is a functional block diagram representing the configuration of the IC chip processing device according to the second embodiment. As depicted in FIG. 5, the IC chip processing device 100*b* according to the second embodiment has the control unit 101, the RFID antenna 102, the infrared touch panel 104, and the communication interface unit 105, similarly to those of the IC chip processing device 100*a* according to the first embodiment.

On the other hand, loop antenna contained is the loop antenna 103 only. The IC chip processing device 100*b* according to the second embodiment exerts approximately the same function as that exerted by the IC chip processing device 100*a* according to the first embodiment by setting an area of the region enclosed by the loop antenna 103 to approximately the same as the total area of the regions enclosed by the respective loop antenna A 103*a*, the loop antenna B 103*b*, and the loop antenna C 103*c* of the first embodiment.

Note that three menu screens of services provided (the above-described menu 1 display, menu 2 display, and menu 3 display) are displayed on the display screen of the display system 200*a* similarly to those of the first embodiment. The loop antenna 103 is disposed and superimposed on the all menu screens so as to cover all these menu screens.

Figure 6:
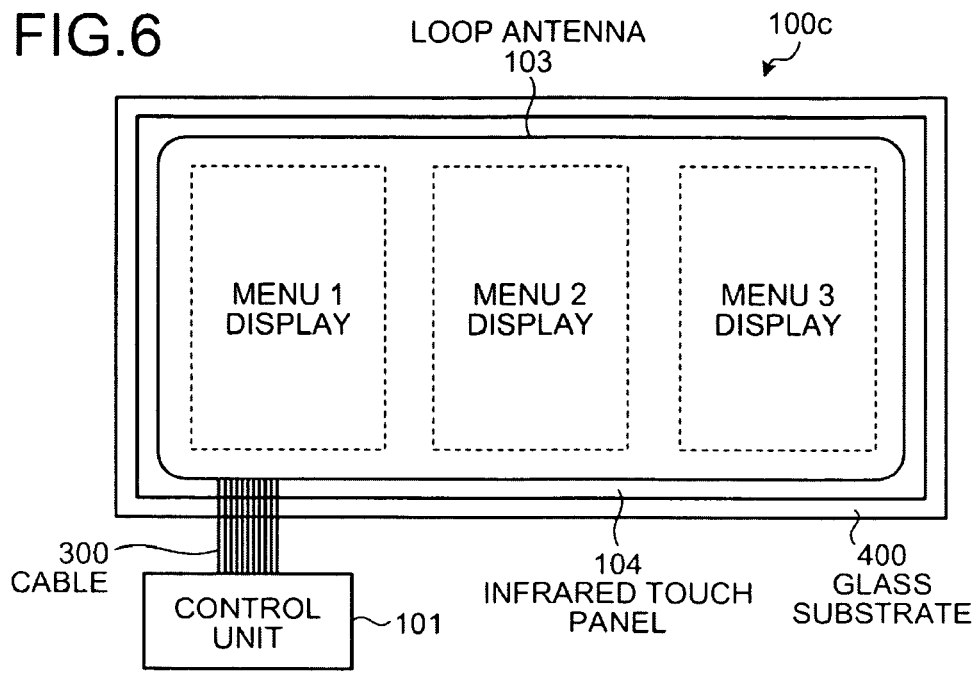
FIG. 6 is a diagram representing general outlines of an IC chip processing device according to a third embodiment.
Figure 7:
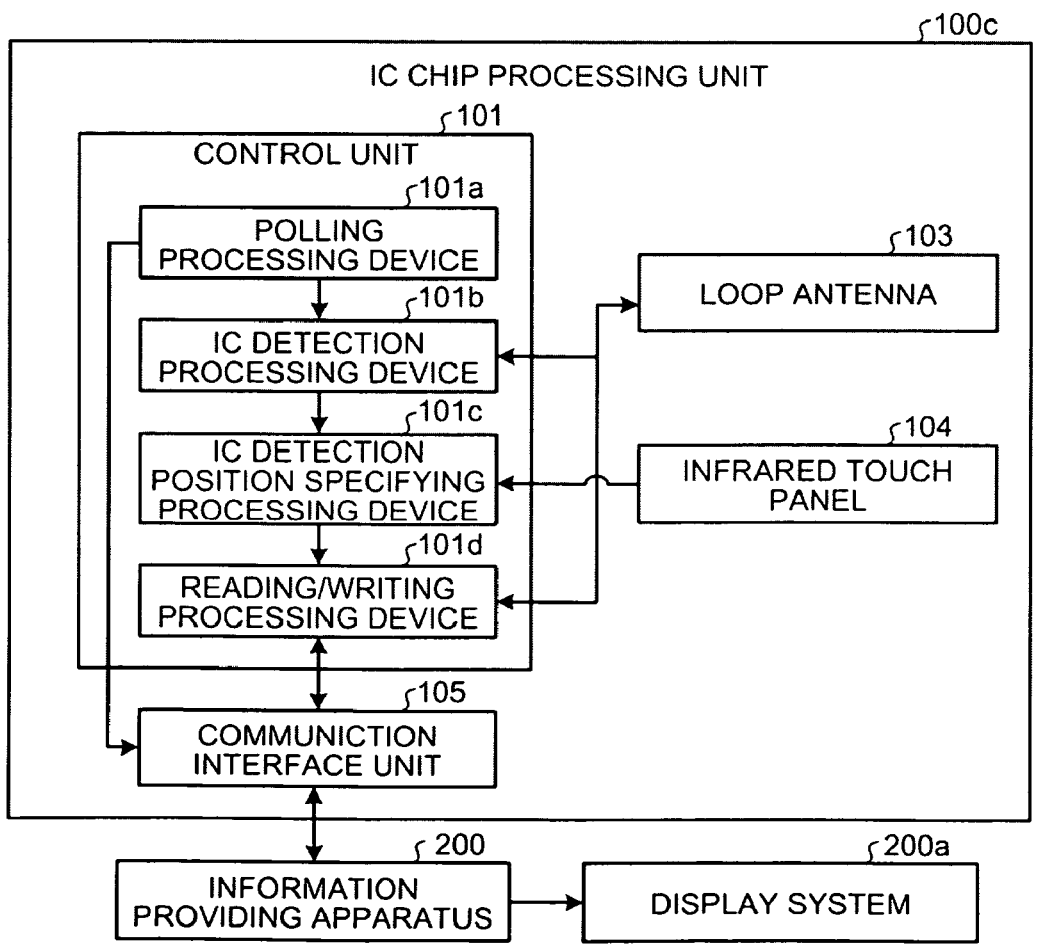
FIG. 7 is a functional block diagram representing a configuration of the IC chip processing device according to the third embodiment.

Hereinafter, a third embodiment will be explained with reference to FIGS. 6 and 7. In the third embodiment, only aspects different from the second embodiment will be explained. FIG. 6 is a diagram representing general outlines of an IC chip processing device according to the third embodiment.

As depicted in FIG. 6, in an IC chip processing device 100*c* according to the third embodiment, the control unit 101 that performs control processing of the IC chip processing device 100*c* and the loop antenna 103 are electrically connected to each other via the cable 300. Accordingly, an electric signal is directly provided from the control unit 101 to the loop antenna 103. The other parts of the configuration are the same as those of the IC chip processing device 100*b* according to the second embodiment.

Next, a configuration of the IC chip processing device according to the third embodiment will be explained. FIG. 7 is a functional block diagram representing the configuration of the IC chip processing device according to the third embodiment. As depicted in FIG. 7, the IC chip processing device 100*c* according to the third embodiment has the control unit 101, the loop antenna 103, the infrared touch panel 104, and the communication interface unit 105, similarly to those of the IC chip processing device 100*b* according to the second embodiment; however, the IC chip processing device 100*c* according to the third embodiment does not have the RFID antenna 102.

Figure 8:
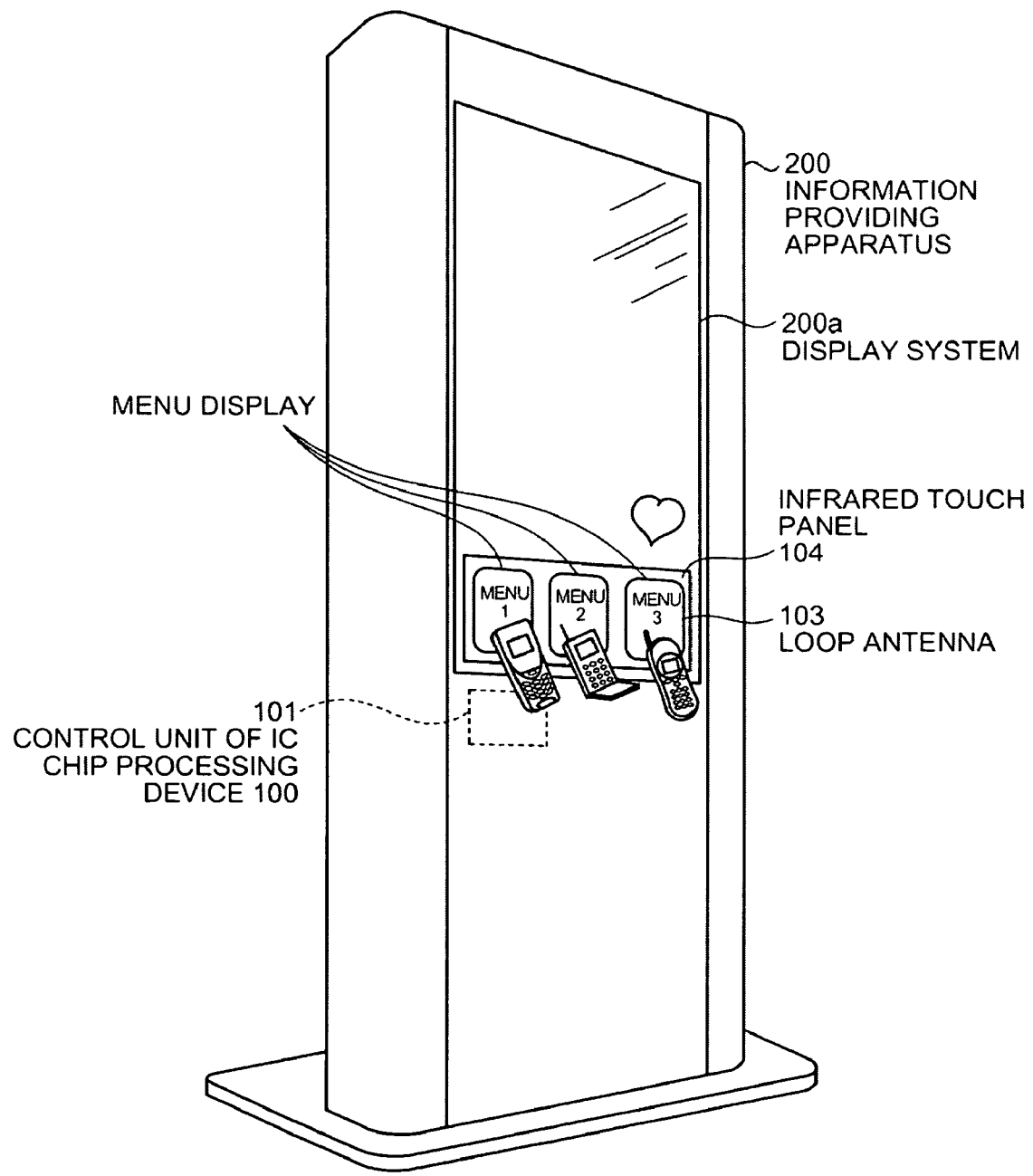
FIG. 8 is a diagram representing an implementation example of the IC chip processing devices according to the first to third embodiments.

Hereinbefore, the first embodiment to the third embodiment have been explained, and an implementation example of the IC chip processing devices according to the first embodiment to the third embodiment will be explained next. FIG. 8 is an illustration representing the implementation example of the IC chip processing devices according to the first embodiment to the third embodiment. As depicted in FIG. 8, the information providing apparatus 200 is provided with the display system 200*a* on the front surface of the box-type housing thereof. The control unit 101 of an IC chip processing device 100 is built in near the portion shown by the broken line in the illustration of the information providing apparatus 200.

When the IC chip processing device is provided with the RFID antenna 102, at least one side of the square coil antenna 102*b* of the RFID antenna 102 is disposed so as to be adjacent to at least one side of at least one loop antenna of the loop antennas 103.

When the IC chip processing device is not provided with the RFID antenna 102, at least one loop antenna of the loop antennas 103 is provided with an electric signal directly from the control unit 101.

In the lowest area of the display screen of the display system 200*a*, the loop antenna(s) 103 and the infrared touch panel 104 are superimposed on each other and disposed on the display screen. Since the infrared touch panel 104 has transparency, a display image in the lowest area of the display screen of the display system 200a is transparently visible regardless of the disposition of the loop antenna(s) 103.

When a plurality of display images in the lowest area of the display screen of the display system 200a are allowed to be displayed in the area enclosed by the loop antenna(s) 103 and when an IC chip mounting medium is held over a plurality of the display images (for example, menu displays), applicable IC chips can communicate with the IC chip processing device via the loop antenna(s) 103, and therefore, the display images can be used as if they were reading surfaces.

According to the first to third embodiments, a plurality of loop antennas are superimposed on the menu displays on the display screen of the display system 200a and disposed, and therefore, by adjusting the number and the size of the loop antenna, the display system 200a has easiness to be designed in a fact that an area of the reading surface can be easily made expanded and reduced.

Further, since an IC chip processing device is allowed to function as if it functioned as a plurality of IC chip processing devices, processing time consumed by arranging (polling processing) a plurality of IC chip processing devices can be shortened. Moreover, since polling processing is performed for only one IC chip processing device, it is always possible to carry out IC chip processing within a predetermined time.

Further, when a plurality of IC chip processing devices are mounted, a disadvantage occurs that each antenna interferes with one another and communication radio waves are influenced badly; however, since only one IC chip processing device is mounted, such interference among the antennas does not occur, which leads to no bad effect on communication radio waves.

Furthermore, compared with a case in which a plurality of IC chip processing devices are mounted, the cost of mounting IC chip processing device to the information providing apparatus 200 can be reduced and the housing space of the information processing device can be made more compact because only one IC chip processing device is mounted, and therefore this results in reduction in manufacturing cost of the information providing apparatus 200.

Compared with the case in which a plurality of IC chip processing devices are mounted, it becomes possible to reduce power consumed by the information providing apparatus 200 to which IC chip processing device is mounted because only one IC chip processing device is mounted.

Still Further, since a menu display on the display screen of the display system 200a and a reading surface are superimposed on each other to serve as one, it is possible to precisely convey to a user a reading surface for providing a desired service.

Hereinbefore, the embodiments of the present invention have been explained; however, the present invention is not limited to the embodiments, and it is apparent that the present invention may be implemented in further various different embodiments within the scope of the technical spirit described in the scope of the claims of the present invention, and moreover, the effects described in the embodiments are not limited to the above.

In the first to third embodiments, indicated are three menu displays that are superimposed on the loop antenna(s) and displayed on the display screen of the display system 200a; however, the number of the menu displays is not limited to the above, and the display size of the menu display and the number thereof can be increased or decreased as necessary such that menu displays are displayed in the area enclosed by the loop antenna(s).

In the first to third embodiments, the substrate on which loop antenna(s) is disposed is the glass substrate 400; however, the substrate is not limited to the above. As long as the substrate is not conductive and electromagnetic inductive (this is because interference with loop antenna(s) can be avoided), has a predetermined strength, and is made of a material having transparency, any substrate can be accepted for use.

In the first to third embodiments, an IC chip mounting medium detection position is detected by use of the infrared touch panel 104; however, the tough panel is not limited to the infrared touch panel 104, and a common touch panel or switch panel may be used. When a common touch panel or switch panel is used, an IC chip mounting medium has to contact the touch panel or the switch panel at an IC chip mounting medium detection position, but there is no problem in practical use.

Further, in each processing explained in the embodiments, all or part of the processing explained as processing automatically performed can be manually performed, or all or part of the processing explained as processing manually performed can be automatically performed with the use of a well-known method. Other than this, the processing procedures, the control procedures, the specific names, and the information including various data and parameters depicted in the embodiments can be arbitrarily changed unless otherwise specified.

Each component of each device depicted in the illustrations is functionally conceptual, and the devices are not necessarily configured physically as depicted in the illustrations. That is, specific formation of the distribution and integration of each device is not limited to that shown, and all or part of the formation can be functionally or physically distributed and integrated to be configured per arbitrary unit depending on various loads and use conditions.

Further, all or an arbitrary part of each processing function performed by each device is realized by programs analyzed and implemented by a central processing device (CPU) (or microcomputer such as micro processing device (MPU) and micro controller unit (MCU)) or an applicable CPU (or microcomputer such as MPU and MCU), or can be realized by wired logic as hardware.

According to one aspect of an embodiment, the position detecting panel detects a position that is contacted or held over by the integrated circuit mounting medium, and therefore the loop antennas divide the area in which a radio wave of near filed radio communication is received. This produces an effect that one integrated circuit processing device is allowed to function as a plurality of integrated circuit processing devices.

According to another aspect of an embodiment, the loop antennas are disposed on a top surface of the substrate having transparency, and the substrate is superimposed and disposed on at least a part of the display surface of the image display medium; therefore this produces an effect that the visibility of the display of the image display medium can be maintained even though the loop antennas are superimposed on the displays of the image display medium.

According to still another aspect of an embodiment, a different service is provided to a user according to a position that is detected by the position detecting panel and contacted or held over by the integrated circuit mounting medium; therefore this produces an effect that one integrated circuit processing device is allowed to function as a plurality of integrated circuit processing devices.

According to still another aspect of an embodiment, the loop antennas are not electrically connected to the control circuit and the antenna and function by electromagnetic induction generated by the antenna; therefore this produces an effect that the loop antenna can be easily disposed.

According to still another aspect of an embodiment, another loop antenna is electrically connected to the control circuit and is operated by the control circuit; therefore this produces an effect that near field radio communication with the integrated circuits mounted in the integrated circuit mounting medium becomes possible by use of only one loop antenna that can be easily disposed.

According to still another aspect of an embodiment, a plurality of the loop antennas are disposed on the top surface of the substrate so as to be adjacent to at least one of the other loop antennas and function by electromagnetic induction generated by the other loop antennas; therefore this produces an effect that expanding the area in which the loop antennas receive a radio wave of near field radio communication becomes possible only by disposing one loop antenna so as to be adjacent to another loop antenna.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An integrated circuit processing device, comprising:
    a first loop antenna;
    a control circuit for providing a service to a user by transmitting information to an integrated circuit mounted in an integrated circuit mounting medium through near field radio communication via the first loop antenna;
    a second antenna electrically connected to the control circuit; and
    a position detecting panel that detects a position where the integrated circuit mounting medium contacts or is held over the position detecting panel, the position detecting panel being disposed so as to cover the first loop antenna, wherein
    the service to be provided is determined based on the position detected by the position detecting panel,
    the first loop antenna is not electrically connected to the control circuit and the second antenna, and
    the first loop antenna is operated by electromagnetic induction generated by the second antenna.

2. The integrated circuit processing device according to claim 1, further comprising:
    a transparent substrate, disposed on at least a part of a display surface of an image display medium, wherein
    the first loop antenna is disposed on a top surface of the substrate.

3. The integrated circuit processing device according to claim 2, further comprising:
    a second loop antenna adjacent to the first loop antenna on the top surface of the substrate, wherein
    the second loop antenna is operated by electromagnetic induction generated by the first loop antenna.

4. An integrated circuit processing method for an integrated circuit processing device that includes a first loop antenna, and a control circuit for providing a service to a user, the integrated circuit processing method comprising:
    detecting, using a position detecting panel, a position where the integrated circuit mounting medium contacts or is held over a the position detecting panel, the position detecting panel being disposed so as to cover the first loop antenna; and
    providing a service to a user by transmitting information to an integrated circuit mounted in an integrated circuit mounting medium through near field radio communication via the first loop antenna, wherein
    the service provided is based on the position detected by the position detecting panel,
    the integrated circuit processing device includes a second antenna electrically connected to the control circuit,
    the first loop antenna is not electrically connected to the control circuit, and
    the first loop antenna is operated by electromagnetic induction generated by the second antenna.

5. The integrated circuit processing method according to claim 4, wherein
    the integrated circuit processing device further includes a transparent substrate disposed on at least a part of a display surface of an image display medium and,
    the first loop antenna is disposed on a top surface of the substrate.

6. The integrated circuit processing method according to claim 5, wherein
    the integrated circuit processing further includes a second loop antenna adjacent to the first loop antenna on the top surface of the substrate, and
    the second loop antenna is operated by electromagnetic induction generated by the first loop antenna.

* * * * *